United States Patent

Hoolhorst et al.

[11] Patent Number: 5,969,331
[45] Date of Patent: Oct. 19, 1999

[54] CARD READING DEVICE

[75] Inventors: Albert Hoolhorst, Be Aardenburg, Netherlands; Paul Ryckaert, Watervliet, Belgium

[73] Assignee: Siemens Aktiengesellschaft, Muenchen, Germany

[21] Appl. No.: 09/174,733

[22] Filed: Oct. 19, 1998

Related U.S. Application Data

[63] Continuation of application No. PCT/DE97/00718, Apr. 9, 1997.

[51] Int. Cl.⁶ .................................................. G06K 5/00
[52] U.S. Cl. ............................................. 235/486; 235/475
[58] Field of Search ..................... 235/441, 486, 235/475, 477, 479, 487, 492; 379/58, 357

[56] References Cited

U.S. PATENT DOCUMENTS

| | | |
|---|---|---|
| 3,777,120 | 12/1973 | Menger et al. . |
| 4,142,312 | 3/1979 | Stokes ........................................ 379/58 |
| 4,724,310 | 2/1988 | Shimamura et al. ................... 235/486 |
| 4,780,604 | 10/1988 | Hasegawa et al. ..................... 235/441 |
| 4,965,821 | 10/1990 | Bishop et al. ............................. 379/58 |
| 5,099,512 | 3/1992 | Shigami et al. ......................... 379/357 |
| 5,257,414 | 10/1993 | Trahan et al. . |

*Primary Examiner*—Thien Minh Le
*Attorney, Agent, or Firm*—Herbert L. Lerner; Laurence A. Greenberg

[57] ABSTRACT

A card reading device for receiving and/or passing on information provided by or for a card. The card reading device has a compartment that makes it possible for the card to be pushed into the card reading device. The card reading device described is distinguished by a resiliently held locking element which, in an initial position, protrudes into the compartment and is configured in such a way that the card can make contact with a first region or a second region of the locking element when it is pushed into the compartment. In particular, the entry of the card is dependent on its orientation when it is pushed into the card reading device. When the card runs onto the first region, the locking element can be pushed away by the card, allowing the entry of the card into the compartment. When the card runs onto the second region of the locking element, the latter keeps the compartment blocked and thereby prevents the continued entry of the card into the compartment.

8 Claims, 2 Drawing Sheets

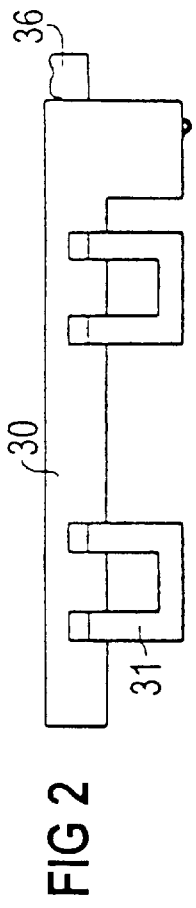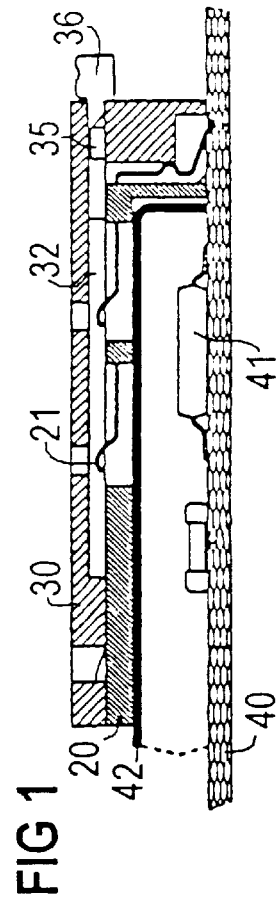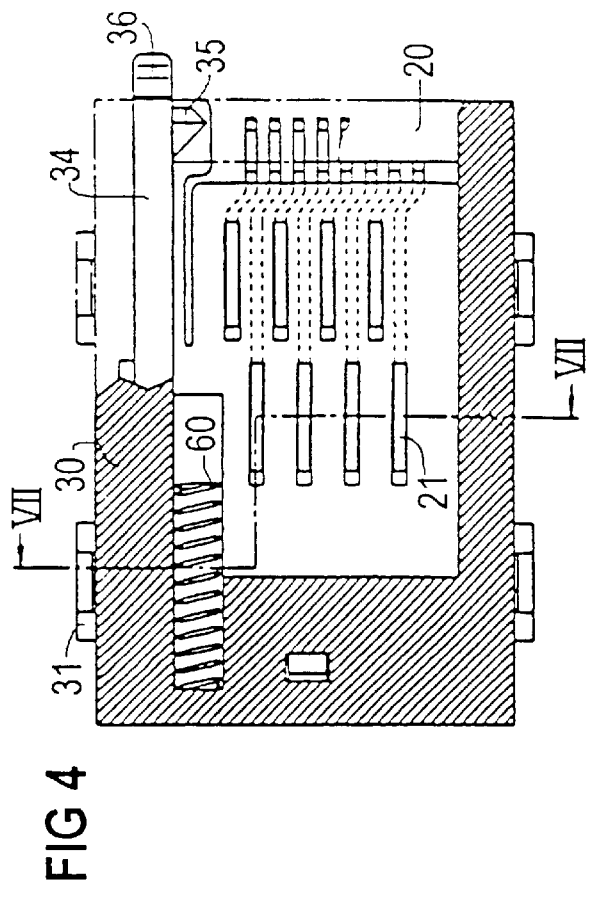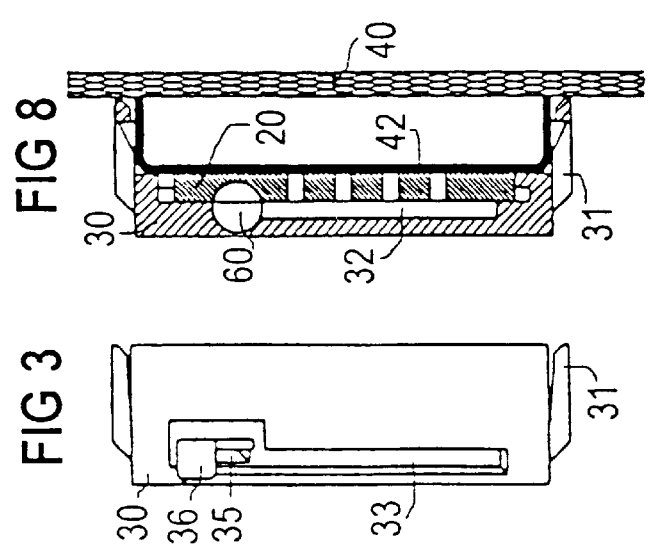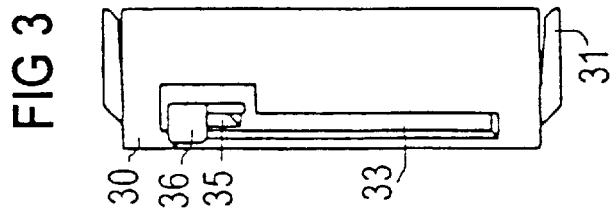

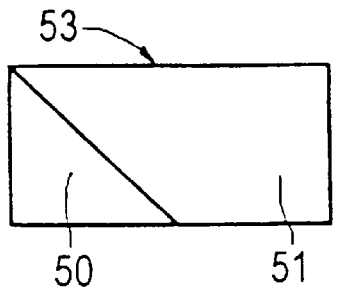
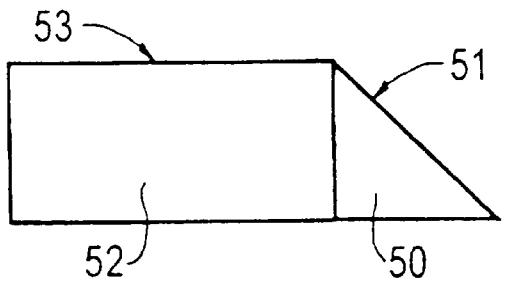
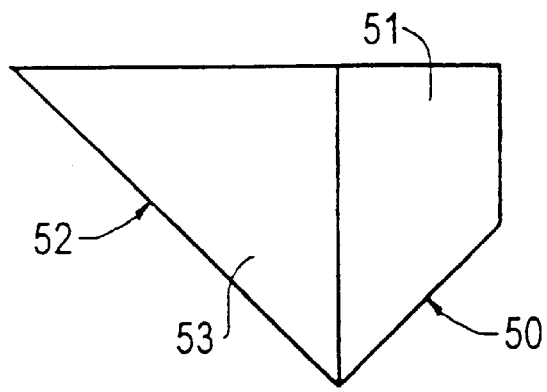
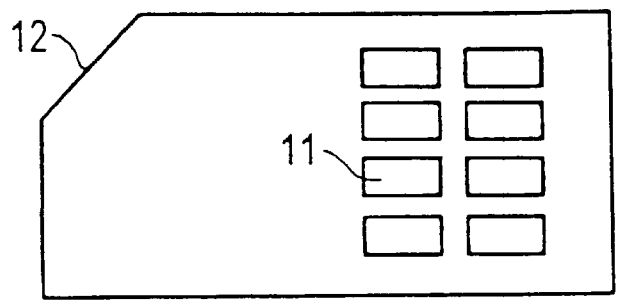

CARD READING DEVICE

CROSS-REFERENCE TO RELATED APPLICATION

This is a continuation of copending International Application PCT/DE97/00718, filed Apr. 9, 1997, which designated the United States.

BACKGROUND OF THE INVENTION

Field of the Invention

The present invention relates to a card reading device for receiving and/or passing on information provided by or for a card. The card reading device has a compartment for receiving the card and a locking mechanism.

There are many different types of card reading devices. One of the possible embodiments is known from European Patent EP 0 472 692 B1, in particular from FIGS. 1 to 3 therein and the description referring to them. The card reading device described in the European Patent EP 0 472 692 B1 is intended for the reading of so-called SIM cards or SIMs. SIMs are currently used in particular in mobile phones for subscriber identification. Here, "SIM" is the abbreviation for "Subscriber Identity Module". In particular on account of their small dimensions (25*15 mm), SIMs are increasingly replacing the relatively large chip cards previously used for this purpose.

The SIM in general has on its surface a multiplicity of surface contacts (generally 6 or 8 of them), which are precisely defined in their position and have to be contacted by the card reading device to permit an exchange of information. To make it possible to prevent the SIMs from being incorrectly placed or inserted into the card reading device, the essentially rectangular SIM has in one of its corner portions a so-called (standardized) polarizing bevel.

SIMs of this type are pushed into the card reading device known from European Patent EP 0 472 692 B1, to be more precise into its compartment provided for this purpose. If the SIM is correctly oriented, the portion of it having the polarizing bevel protrudes rearward out of the card reading device and can be brought into engagement there with an arresting mechanism.

The arresting mechanism is formed by a holding arm, extending from the card reading device, and an arresting element provided at the free end in the form of a stop. The stop is configured and positioned in such a way that, in the properly, i.e. correctly oriented, inserted state of the SIM, and only in this state, it can grip behind the rear edge of the SIM protruding out of the card reading device, to be more precise essentially its polarizing bevel, and can thereby arrest the SIM in its reading position.

The holding arm can be pushed away resiliently by hand in order not to be in the way of inserting the SIM into the card reading device and removing it from the same in a way which cannot be overcome.

The relatively laborious insertion of the SIM into the card reading device involves pushing the holding arm away manually. However, damage and malfunctions of the SIM are possible as a consequence of an incorrectly oriented insertion of the SIM into the card reading device, for which the arresting mechanism evidently cannot offer any reliable protection. Understandably such problems cannot be ignored.

A card reading device that is significantly improved in this respect is the card reading device disclosed in U.S. Pat. No. 3,777,120. This card reading device has a resiliently held locking element which, in the starting position, protrudes into the compartment and is constructed in such a way that the card can make contact with a first region or a second region of the locking element when it is pushed into the compartment, in particular in a way dependent on its orientation when it is pushed in. When the card runs onto its first region, the locking element can be pushed away by it, releasing the compartment for continued pushing in of said card. When the card runs onto the second region of the locking element, the latter keeps the compartment blocked and thereby prevents continued pushing in of the card. Such a locking element makes it possible that the card can only be inserted into the card reading device in a correctly oriented manner. However, as before, an arresting mechanism is required for arresting the card in the reading position, with the result that the structural configuration and/or operation of the card reading device remains relatively complicated.

SUMMARY OF THE INVENTION

It is accordingly an object of the invention to provide a card reading device that overcomes the above-mentioned disadvantages of the prior art devices of this general type, in which the insertion and removal of a card such as a SIM and the like into and from the card reading device can be carried out simply and with the exclusion as far as possible of damage and malfunctions as a consequence of an incorrectly oriented insertion of the SIM card into the card reading device.

With the foregoing and other objects in view there is provided, in accordance with the invention, in combination with a card, a card reading device for receiving and passing on information provided by or for the card, including: a card reading body having a compartment formed therein for receiving the card pushed into the compartment; a resiliently held locking element having a first region and a second region disposed on the card reading body, the resiliently held locking element in an initial position protruding into the compartment and the card upon entry into the compartment making contact with one of the first region and the second region of the locking element, an orientation of the card dictating contact with one of the first region and the second region, if the card runs onto the first region the locking element is pushed away by the card opening the compartment for the continued entry of the card, if the card runs onto the second region of the locking element the second region blocks the entry of the card into the compartment; and upon the card completely passing over the locking element the card stops pushing away the locking element and the locking element automatically returning to the initial position and once again blocking entry into the compartment, the locking element also gripping from behind the card pushed into the compartment and arresting the card in a reading position.

The locking element blocking the compartment can be automatically pushed away resiliently by the card itself, without any special action on the part of the user of the card reading device, as the card is pushed in. To be more precise, it is configured in such a way that it can be pushed away in a direction making the compartment passable only in one or more selected orientations of the card, and in such a way that in all other orientations of the card pressure is likewise brought to bear against the locking element, but in a direction along which the locking element is not displaceable or not in any case out of the region of the compartment which has to be released for pushing in the card.

The locking element is also disposed and configured such that, after the card has been taken past it completely, it automatically engages behind it while gripping behind it. The locking element can consequently serve at the same time as an arresting element that arrests the card when it reaches its reading position, while returning automatically into the starting position.

The insertion of the card into the card reading device according to the invention, including the arresting of the card in the reading position, can consequently be accomplished extremely simply.

This therefore provides a card reading device by which the insertion and removal of a card such as a SIM and the like into and from the card reading device can be carried out simply and with the exclusion as far as possible of damage and malfunctions as a consequence of an incorrectly oriented insertion of the card into the card reading device.

In accordance with an added feature of the invention, the card is a subscriber identity module (SIM) having a polarizing bevel.

In accordance with an additional feature of the invention, only a region of the SIM not containing the polarizing bevel pushing into the compartment can contact the first region of the locking element, and only a region of the SIM containing the polarizing bevel pushing into the compartment can contact the second region of the locking element.

In accordance with another feature of the invention, the first region of the locking element has a slope on which the card can slide over while simultaneously pushing away the locking element.

In accordance with a further added feature of the invention, the second region of the locking element is an immovable stop for a region of the card running onto the second region.

In accordance with a further additional feature of the invention, if the polarizing bevel of the card completely passes over the locking element, the locking element returns to the initial position and grips from behind the polarizing bevel such that the locking element acts as a stop which cannot be moved by the card.

In accordance with yet another feature of the invention, there is a resilient holding arm holding the locking element, the resilient holding arm can be actuated from outside the card reading body and moves in tandem with the locking element.

In accordance with a concomitant feature of the invention, there is a resilient element housed in the compartment for coming into contact with the card and exerting a force directed counter to a pushing-in direction of the card if the card is pushed into the compartment.

Other features which are considered as characteristic for the invention are set forth in the appended claims.

Although the invention is illustrated and described herein as embodied in a card reading device it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic lateral sectional view of a configuration including a card reading device according to the invention;

FIG. 2 is a side-elevational view of the card reading device removed from the configuration shown in FIG. 1;

FIG. 3 is a front elevational view of the card reading device removed from the configuration shown in FIG. 1 rotated 90°;

FIG. 4 is a sectional view seen from above according to the representation shown in FIG. 1 of the configuration;

FIG. 5 is an enlarged, diagrammatic view of a locking element;

FIG. 6 is an enlarged, diagrammatic view of the locking element shown in FIG. 1;

FIG. 7 is an enlarged, diagrammatic view of the locking element shown in FIG. 4;

FIG. 8 is a sectional view taken along the line VII—VII shown in FIG. 4; and

FIG. 9 is a plan view of a SIM card or a SIM.

DESCRIPTION OF THE PREFERRED EMBODIMENTS

The card reading device described below is suitable for receiving and/or passing on information provided by or for a SIM card, SIM and the like. However, is can also be used in principle, i.e. with corresponding adaptation to the changed circumstances, for differently shaped and different types of cards, to be precise in particular for those cards which are provided with mechanical codings, such as for example the polarizing bevel of the SIMs.

In all the figures of the drawing, sub-features and integral parts that correspond to one another bear the same reference symbol in each case. Referring now to the figures of the drawing in detail and first, particularly, to FIG. 9 thereof, there is shown the plan view of such a SIM 10. The SIM 10 shown there has on its surface a multiplicity of surface contacts 11 (generally 6 or 8 of them), which are precisely defined in their position and have to be contacted by a card reading device to permit an exchange of information. To make it possible to prevent the SIM 10 from being incorrectly placed or inserted into the card reading device, the essentially rectangular SIM 10 has in one of its corner portions a so-called (standardized) polarizing bevel 12.

Among the tasks of the card reading device under consideration is that of contacting the surface contacts 11 of the SIM 10 in order to be able to communicate with it. Although the electrical circuit for controlling and evaluating the communication can be accommodated within the housing of the card reading device, it is not a component part of the actual card reading device.

In the case of the card reading device under consideration, the corresponding control and evaluation electronics are accommodated outside the actual card reading device.

In the present exemplary embodiment, the card reading device essentially includes two component parts, namely a contact carrier part 20 and a covering part 30.

A lateral sectional view of a configuration including such a card reading device is shown in FIG. 1. The contact carrier part 20 has a plurality of contact elements 21, the task of which is to connect the surface contacts 11 of the SIM 10 electrically to corresponding terminals of an electrical circuit board 40. The card reading device and other electronic, electrical and electromechanical components 41 are mounted on the circuit board 40.

The ends of the contact elements 21 which are intended to contact the surface contacts 11 of the SIM 10 are configured as spring domes and are positioned in such a way that, in the properly pushed-in state of the SIM 10, i.e. in the reading position of the same, the surface contacts 11 can be reliably and safely contacted by correspondingly pushing them one against the other (solderless press bonding). The measures specifically to be provided for this purpose should be apparent to a person skilled in the art without any further explanation.

The other ends, respectively, of the contact elements 21, that is to say the portions of the contact elements 21 which are intended to contact the corresponding terminals of the circuit board 40, are adapted to the type and positioning of the respective terminals on the circuit board 40. The connection to the circuit board 40 may be performed here in a wide variety of ways. Customary methods of connection include, inter alia, soldering (for example by an SMT soldering method), pressing, a plug-in connection, etc. In the present exemplary embodiment, the contact element ends are likewise configured as spring domes, whereby the connection can also be realized as a solderless press bond.

In the assembled state of the card reading device, the covering part 30 is disposed over the contact carrier part 20.

As can be seen in particular from FIGS. 2 and 3, which show a lateral view (FIG. 2) and a frontal view (FIG. 3) of the card reading device removed from the configuration according to FIG. 1, the covering part 30 has a plurality of latching elements in the form of latching levers 31. The latching levers serve for fastening the covering part 30 and the contact carrier part 20 on or in a configuration including the card reading device, to be more precise on its housing, the circuit board(s) 40, or other components of the configuration. In the present exemplary embodiment, the fastening is performed mainly by engaging the latching levers 31 with corresponding counterpieces (detents) on the side walls of an RF shielding cage 42 on the circuit board 40.

The engaging mechanism configured as described or in a comparable manner is dimensioned in such a way that the engagement of the covering part 30 on the shielding cage 42 is accompanied by the contact carrier part 20 being clamped essentially immovably in a defined (proper) position between these components.

As can be seen in particular from FIGS. 1 and 7, which is to be further described later, between the covering part 30 and the contact carrier part 20 there is an essentially free space or compartment 32. The SIM 10 can be pushed from the exterior into the compartment 32 of the card reading device (from the right according to the representation in FIG. 1). The card inserting side of the covering part 30 has for this purpose, as can be seen in particular from FIG. 3, an essentially slot-like insertion opening 33.

To allow the SIM 10 to be pushed into the card reading device, to be removed from the same, and arrested in its reading position in a simple manner, a special, multifunctional locking mechanism is provided in the case of the present exemplary embodiment. As can be seen from the FIGS. 3 and 4, the locking mechanism essentially includes a resiliently movable holding arm 34, which runs through the compartment 32 and finally emerges from the card reading device laterally alongside the insertion opening 33. The locking mechanism also bears a locking element 35 and has an actuating element 36 at its free end, i.e. the end protruding out of the card reading device.

The holding arm 34 has an essentially rectangular cross section and, like the covering part 30 and like the contact carrier part 20, with which it forms an interconnected, preferably one-piece unit, is produced from electrically nonconductive plastic.

It can be seen from FIG. 4, which shows a sectional view of the card reading device seen from above according to the representation in FIG. 1, that the holding arm 34 runs along the lateral edge of the compartment 32 and in the process remains essentially outside the compartment region which is occupied by an inserted SIM 10 or one that is to be inserted.

The locking element 35, configured as a locking cam, is provided on the holding arm 34 in the vicinity of the insertion opening 33, provided at the right-hand edge according to the representations in FIGS. 1, 2 and 4, i.e. relatively close behind the insertion opening 33. The locking element 35 is provided on a side of the holding arm 34 which is facing the region of the compartment 32 receiving the SIM 10 and extends from there into the region of the compartment 32 receiving the SIM 10.

The structural configuration, function and operating principle of the locking element 35 are explained below with reference to FIGS. 5 to 7. FIG. 5 shows an enlarged representation of the view of the locking element shown in FIG. 3 (view through the insertion opening 33 of the covering part 30). FIG. 6 shows an enlarged representation of the view of the locking element shown in FIG. 1, and FIG. 7 shows an enlarged representation of the view of the locking element 35 shown in FIG. 4.

The locking element 35 is of a polyhedral formation with a multiplicity of surface portions, of which the most important are denoted by the reference numerals 50 to 53 in FIGS. 5 to 7. The configuration, function and operating principle of which are revealed by FIGS. 5 to 7 and the following functional description.

The card reading device considered, to be more precise its locking element 35, is configured such that the SIM 10 can be pushed into the card reading device only in selected orientations. In the case of the present exemplary embodiment, the selected orientations are all the orientations except for the side with the polarizing bevel 12 of the SIM 10. The polarizing bevel is the portion of the SIM 10 which runs onto the locking element and blocks the compartment in the starting or initial position, when the SIM 10 is pushed in The sequence of events when pushing in the SIM 10 in one of the selected orientations (orientations which make pushing in possible) is described below on the basis of that orientation of the SIM 10 which at the same time makes possible a contacting of the surface contacts 11 of the SIM 10 with the respectively assigned contact elements 21 of the contact carrier part 20 of the card reading device. In the exemplary embodiment considered, this orientation, referred to in the following as the proper orientation, of the SIM 10 occurs whenever the polarizing bevel 12 of the SIM 10, in the state in which the latter is completely inserted into the compartment 32, comes to lie in that portion of the compartment 32 housing the locking element 35. That is to say, according to the representation in FIG. 4, at the top right in the compartment.

The pushing in of the properly oriented SIM 10 into the compartment 32 of the card reading device proceeds as described below.

Passing the insertion opening 33, the front edge of the SIM 10 enters the compartment 32. The insertion opening 33 has beveled portions running toward one another in a funnel-like manner, which facilitates the introduction of the SIM 10 into the insertion opening 33. When it has arrived in the compartment 32, the front edge of the SIM 10, to be more precise its one corner region, immediately comes into contact with the locking element 35, to be more precise its slope 51, located in the pushing-in path and blocking it. When pushing in of the SIM 10 is continued, its front edge runs or slides along on the slope 51 of the locking element 35 (upward according to the representation in FIGS. 1 and 6). At the same time, the locking element 35 is resiliently bent away (downward according to the representation in FIGS. 1 and 6), together with the holding arm 34 bearing it, with the result that the path is now free for the further pushing in of the SIM 10. The access to the compartment 32 is thus pushed open by displacing the locking element 35. As it is pushed in further, the SIM 10 comes into contact with a helical spring 60, which is embedded between the contact carrier part 20 and the covering part 30 (see FIG. 7) and can be resiliently pressed together by continued pushing in of the SIM 10. Approximately when the rear edge of the SIM 10 reaches the insertion opening, the SIM 10 finally arrives in its reading position, i.e. that position in which the surface contacts 11 of the SIM 10 are electrically connected to the contact elements 21 of the card reading device. Approximately at the same time, the polarizing bevel 12 of the SIM 10 passes the locking element 35, which finally (when it passes completely) has the consequence of releasing the locking element 35 and making it possible for the latter to return into its initial (starting) position. The locking element 35 now returned to the starting position forms a stop that grips behind the SIM 10, to be more precise its polarizing bevel 12, and can be moved out of the path only by a pushing away of the locking element 35 performed from outside the card reading device (by a corresponding actuation of the actuating element 36). This is the case because the stop, formed by the surface 52 of the locking element 35, is configured and oriented in such a way that the polarizing bevel 12 of the SIM 10 butts against the latter frontally at right angles. This excludes the possibility of the components that meet one another from sliding over one another, and pushing away the locking element 35 in the process, as takes place when the SIM 10 is pushed in. The forces acting on the locking element 35, for example originating from the helical spring 60 or resulting from an attempt to pull the SIM 10 out of the compartment 32, are also unable to push the locking element 35 away in another direction, releasing the path, since, by virtue of its configuration, the locking element 35 is able to be pushed away or displaced only to a restricted extent, i.e., according to the representations in FIGS. 1 to 3, essentially only downward and/or upward. Thus, in interaction with the helical spring 60, the locking element 35 ensures that, when it is inserted into the card reading device in a properly oriented manner and only then, as will be further explained below, the SIM 10 is arrested essentially immovably in the reading position.

For removing the SIM 10 from the card reading device, the actuating element 36 of the locking mechanism must be actuated by the user of the device, to be precise by pushing down the actuating element 36 performed according to the representation in FIGS. 1 to 3. The opening in the covering part 30, through which the portion of the holding arm 34 configured as the actuating element 36 is brought to the exterior of the card reading device, is dimensioned in such a way that, on the one hand, it allows an adequate downward movement and, on the other hand, it can serve as a stop for the actuating element 36, preventing excessive downward movement.

The downward pushing of the actuating element 36 has the effect that the holding arm 34 is bent resiliently downward, whereby the locking element 35 provided on it is likewise moved downward and thus opens the path for the SIM 10 to be moved out of the compartment 32. The SIM 10 is pushed out of the card reading device by the force exerted by the helical spring 60 to such an extent that the user can effortlessly grasp it and pull it out completely. After the SIM 10 has been pulled out, the locking element 35 springs back automatically into its starting position again, blocking the compartment 32.

Let us now consider the case in which the SIM 10 is inserted into the card reading device not in a properly oriented manner, but in an orientation that makes pushing the SIM into the card reading device possible but the retention of the SIM in card reading device impossible.

In this case, the pushing in of the SIM 10 initially proceeds as in the case of the proper orientation of the SIM 10. That is to say the access to the compartment 32 is automatically pushed free by the already explained interaction between the uncoded front edge of the SIM 10 and the slope 51 of the locking element 35 that accompanies the pushing in of the SIM 10. When the SIM 10 has been pushed completely into the compartment 32, it is however the case here that the SIM 10, to be more precise its rear edge portion, which is likewise uncoded (does not have the polarizing bevel 12) on the locking element side, has not yet passed or crossed over the locking element 35. This results in the locking element 35 continuing to remain in the position in which it is pushed away downward and consequently cannot bring about any arresting (gripping behind) of the SIM 10. Instead, once it has been released, the SIM 10 is immediately pushed out of the card reading device again by the helical spring 60, and thus is not accepted in a clearly visible way. This can serve the user of the card reading device as an indication of a not properly oriented insertion of the SIM 10 into the card reading device.

The attempt to insert the SIM card 10 in an orientation which does not make insertion possible, that is to say the attempt to insert it in a case where the polarizing bevel 12 runs onto the locking element 35 during insertion of the SIM 10, proceeds is described below.

As also in the case of the orientations of the SIM 10 which have been considered so far, the front edge of the SIM 10 passes the insertion opening 33 and enters the compartment 32. Once it has arrived there, it, to be more precise the polarizing bevel 12, strikes against a surface 50 of the locking element 35. However, unlike the ramp 51, the surface 50 acts as a stop against the SIM 10 that cannot be overcome. Like the stop already explained above in the form of the surface 52 of the locking element 35, the stop is configured and oriented in such a way that the polarizing bevel 12 of the SIM 10 butts against it frontally and at right angles. This excludes the possibility of the components that meet when the SIM is pushed in from sliding over one another as described above. That is to say crossing over the locking element 35 and pushing it away in the process. The forces acting on the locking element 35 are also unable to push the locking element 35 away in another direction, releasing the path, since, by virtue of its construction, the locking element 35 is, as already mentioned above, able to be pushed away or displaced only to a restricted extent, i.e., according to the representations in FIGS. 1 to 3, essentially only downward and/or upward. This reliably excludes the possibility of the locking element 35 being passed by a SIM 10 inserted in such a manner. In this way it is possible to prevent the helical spring 60 from being crushed by the polarizing bevel 12 of the SIM 10 and consequently made unusable. This should be apparent from the figures and needs no further explanation.

It goes without saying that not only the helical spring 60 but also any other portions of the card reading device and/or of the SIM 10 can be protected against damage in this or a similar way. Similarly, malfunctions as a consequence of improper electrical connections or the like can be prevented in this way.

The invention is not restricted to the blocking action of the locking element to prevent pushing in of the SIM 10 into the compartment being induced specifically by the polarizing bevel 12 meeting the locking element 35. By corresponding reorientation of the surfaces 50 and 51, precisely the opposite effect can be accomplished, i.e. the effect that an insertion of the SIM 10 is made possible only when the polarizing bevel 12 meets the locking element.

Independently of this, the position of the locking element 35 within the compartment can be changed in any way desired, that is to say it can be freely selected, in particular in adaptation to the card used (in particular the position and configuration of the coded portion of the card) and/or the position of the regions of the card reading device and/or card to be protected.

Furthermore, under certain circumstances it may also prove to be advantageous to provide not just a single locking mechanism but any number of additional locking mechanisms (at strategically favorable locations), which may be constructed identically to or differently from the locking mechanism described and may respond identically or differently to any desired events.

Consequently, with card reading devices and cards of any desired configuration, it can always be ensured that the insertion and removal of a card into and from the card reading device can be carried out simply and with the exclusion as far as possible of damage and malfunctions as a consequence of an incorrectly oriented insertion of the card into the card reading device.

We claim:

1. In combination with a card, a card reading device for receiving and passing on information provided by or for the card, comprising:

a card reading body having a compartment formed therein for receiving the card pushed into said compartment;

a resiliently held locking element having a first region and a second region disposed on said card reading body, said resiliently held locking element in an initial position protruding into said compartment and the card upon entry into said compartment making contact with one of said first region and said second region of said locking element, an orientation of the card dictating contact with said one of said first region and said second region, if the card runs onto said first region said locking element being pushed away by the card and opening said compartment for the continued entry of the card, if the card runs onto said second region of said locking element said second region blocking said entry of the card into said compartment; and upon the card completely passing over said locking element the card stops pushing away said locking element and said locking element automatically returning to said initial position and once again blocking entry into said compartment, said locking element also gripping from behind the card pushed into said compartment and arresting said card in a reading position.

2. The card reading device according to claim 1, wherein the card is a subscriber identity module (SIM) having a polarizing bevel.

3. The card reading device according to claim 2, wherein only a region of the SIM not containing the polarizing bevel pushing into said compartment can contact said first region of the locking element, and only a region of the SIM containing the polarizing bevel pushing into said compartment can contact said second region of the locking element.

4. The card reading device according to claim 1, wherein said first region of said locking element has a slope on which the card can slide over while simultaneously pushing away said locking element.

5. The card reading device according to claim 1, wherein said second region of said locking element is an immovable stop for a region of the card running onto said second region.

6. The card reading device according to claim 1, wherein if the polarizing bevel of the card completely passes over said locking element, said locking element returns to said initial position and grips from behind the polarizing bevel such that said locking element acts as a stop which cannot be moved by the card.

7. The card reading device according to claim 1, including a resilient holding arm holding said locking element, said resilient holding arm can be actuated from outside said card reading body and moves in tandem with said locking element.

8. The card reading device according to claim 1, including a resilient element housed in said compartment for coming into contact with the card and exerting a force directed counter to a pushing-in direction of the card if the card is pushed into said compartment.

* * * * *

UNITED STATES PATENT AND TRADEMARK OFFICE
CERTIFICATE OF CORRECTION

PATENT NO. : 5,969,331
DATED : October 19, 1999
INVENTOR(S) : Albert Hoolhorst et al.

It is certified that error appears in the above-identified patent and that said Letters Patent is hereby corrected as shown below:

Title page, Item [30] should read as follows:

Apr. 19, 1996    [DE]   Germany .......... 196 15 659.9

Signed and Sealed this

Fifth Day of December, 2000

Attest:

Q. TODD DICKINSON

*Attesting Officer*    *Director of Patents and Trademarks*